(12) United States Patent
Bobde et al.

(10) Patent No.: US 7,653,715 B2
(45) Date of Patent: Jan. 26, 2010

(54) METHOD AND SYSTEM FOR SUPPORTING THE COMMUNICATION OF PRESENCE INFORMATION REGARDING ONE OR MORE TELEPHONY DEVICES

(75) Inventors: Nikhil Bobde, Redmond, WA (US);
Robert Brown, Redmond, WA (US);
Jeremy T. Buch, Redmond, WA (US);
Ajay P. Chitturi, Bellevue, WA (US);
Ann Demirtjis, Redmond, WA (US);
Vishwajith Kumbalimutt, Redmond, WA (US); David J. Simons, Redmond, WA (US); Zachary Taylor, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 11/343,644

(22) Filed: Jan. 30, 2006

(65) Prior Publication Data
US 2006/0190525 A1 Aug. 24, 2006

Related U.S. Application Data

(63) Continuation of application No. 10/145,673, filed on May 15, 2002, now abandoned.

(51) Int. Cl.
*G06F 15/16* (2006.01)
(52) U.S. Cl. ........................ 709/223; 709/224
(58) Field of Classification Search ......... 709/200–203, 709/217–227, 204–205, 228–231
See application file for complete search history.

(56) References Cited

U.S. PATENT DOCUMENTS

| 4,570,227 | A | 2/1986 | Tachi et al. |
| 5,179,519 | A | 1/1993 | Adachi et al. |
| 5,220,507 | A | 6/1993 | Kirson |

(Continued)

FOREIGN PATENT DOCUMENTS

JP 2000/115373 4/2000

(Continued)

OTHER PUBLICATIONS

Handley et al., "SIP: Session Initiation Protocol," Network Working Group, RFC 2543, Category: Standards Track, Internet RFC/STD/FYI/BCP Archives, Mar. 1999, pp. 1-102.

(Continued)

*Primary Examiner*—Moustafa M Meky
(74) *Attorney, Agent, or Firm*—Merchant & Gould P.C.

(57) ABSTRACT

A system for detecting and communicating the presence of one or more computing devices is presented. The invention also presents a method and system for aggregating presence information generated by multiple devices associated with a single user. A server acting as a presence agent on behalf of a first user receives and responds to a subscription request generated by a computing device operated by a second wishing to be permitted as a watcher of the first user. When the second user corresponds to access preferences of the first user, a notify message is sent to the second user's device that includes presence information indicative of an activity level and availability level associated with the first user. When the first user employs multiple computing devices, the server generates an aggregate presence document that is representative of the overall presence of the first user.

16 Claims, 3 Drawing Sheets

U.S. PATENT DOCUMENTS

| | | | |
|---|---|---|---|
| 5,493,692 | A | 2/1996 | Theimer et al. |
| 5,544,321 | A | 8/1996 | Theimer et al. |
| 5,555,376 | A | 9/1996 | Theimer et al. |
| 5,603,054 | A | 2/1997 | Theimer et al. |
| 5,608,635 | A | 3/1997 | Tamai |
| 5,611,050 | A | 3/1997 | Theimer et al. |
| 5,737,886 | A | 4/1998 | Kruckemeyer |
| 5,802,518 | A | 9/1998 | Karaev et al. |
| 5,812,865 | A | 9/1998 | Theimer et al. |
| 5,835,881 | A | 11/1998 | Trovato et al. |
| 5,911,773 | A | 6/1999 | Mutsuga et al. |
| 6,078,865 | A | 6/2000 | Koyanagi |
| 6,119,065 | A | 9/2000 | Shimada et al. |
| 6,260,148 | B1 | 7/2001 | Aggarwal et al. |
| 6,269,099 | B1 | 7/2001 | Borella et al. |
| 6,298,304 | B1 | 10/2001 | Theimer |
| 6,339,746 | B1 | 1/2002 | Sugiyama et al. |
| 6,415,318 | B1 | 7/2002 | Aggarwal et al. |
| 6,463,145 | B1 | 10/2002 | O'Neal et al. |
| 6,466,232 | B1 | 10/2002 | Newell et al. |
| 6,477,240 | B1 | 11/2002 | Lim et al. |
| 6,477,460 | B2 | 11/2002 | Kepler |
| 6,510,461 | B1 | 1/2003 | Nielsen |
| 6,513,046 | B1 | 1/2003 | Abbott, III et al. |
| 6,519,639 | B1 | 2/2003 | Glasser et al. |
| 6,526,350 | B2 | 2/2003 | Sekiyama |
| 6,549,915 | B2 | 4/2003 | Abbott, III et al. |
| 6,622,089 | B2 | 9/2003 | Hasegawa et al. |
| 6,694,252 | B2 | 2/2004 | Ukita |
| 6,728,635 | B2 | 4/2004 | Hamada et al. |
| 6,747,675 | B1 | 6/2004 | Abbott et al. |
| 6,748,225 | B1 | 6/2004 | Kepler |
| 6,791,580 | B1 | 9/2004 | Abbott et al. |
| 6,801,223 | B1 | 10/2004 | Abbott et al. |
| 6,807,423 | B1 | 10/2004 | Armstrong et al. |
| 6,812,937 | B1 | 11/2004 | Abbott et al. |
| 6,839,735 | B2 | 1/2005 | Wong et al. |
| 6,842,877 | B2 | 1/2005 | Robarts et al. |
| 6,850,968 | B1 | 2/2005 | Pfeffer et al. |
| 6,853,634 | B1 | 2/2005 | Davies et al. |
| 6,870,830 | B1 | 3/2005 | Schuster et al. |
| 6,898,518 | B2 | 5/2005 | Padmanabhan |
| 6,952,647 | B2 | 10/2005 | Hasegawa et al. |
| 7,007,085 | B1 | 2/2006 | Malik |
| 7,027,432 | B2 | 4/2006 | Carolan et al. |
| 7,035,923 | B1 | 4/2006 | Yoakum et al. |
| 7,103,167 | B2 | 9/2006 | Brahm et al. |
| 7,103,473 | B2 | 9/2006 | Ranjan |
| 7,215,760 | B2 | 5/2007 | Lenard |
| 7,218,722 | B1 | 5/2007 | Turner et al. |
| 7,227,937 | B1 | 6/2007 | Yoakum et al. |
| 7,269,162 | B1 * | 9/2007 | Turner ..................... 370/352 |
| 7,310,532 | B2 * | 12/2007 | Knauerhase et al. ..... 455/456.1 |
| 7,359,938 | B1 | 4/2008 | Davies et al. |
| 2001/0007968 | A1 | 7/2001 | Shimazu |
| 2001/0025223 | A1 | 9/2001 | Geiger et al. |
| 2001/0028660 | A1 | 10/2001 | Carolan et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0024947 | A1 * | 2/2002 | Luzzatti et al. ............. 370/352 |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0065894 | A1 | 5/2002 | Dalal et al. |
| 2002/0075303 | A1 * | 6/2002 | Thompson et al. .......... 345/751 |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0087704 | A1 | 7/2002 | Chesnais et al. |
| 2002/0099817 | A1 | 7/2002 | Abbott et al. |
| 2002/0143928 | A1 | 10/2002 | Maltz et al. |
| 2002/0164998 | A1 | 11/2002 | Younis |
| 2002/0165000 | A1 * | 11/2002 | Fok ........................... 455/466 |
| 2002/0173905 | A1 | 11/2002 | Jin et al. |
| 2003/0041101 | A1 | 2/2003 | Hansche et al. |
| 2003/0046401 | A1 | 3/2003 | Abbott et al. |
| 2003/0048195 | A1 | 3/2003 | Trossen |
| 2003/0055897 | A1 | 3/2003 | Brown et al. |
| 2003/0104819 | A1 * | 6/2003 | Knauerhase et al. ........ 455/456 |
| 2003/0110228 | A1 | 6/2003 | Xu et al. |
| 2003/0154476 | A1 | 8/2003 | Abbott, III et al. |
| 2003/0182052 | A1 | 9/2003 | DeLorme et al. |
| 2003/0215078 | A1 | 11/2003 | Brahm et al. |
| 2003/0217098 | A1 | 11/2003 | Bobde et al. |
| 2003/0217099 | A1 | 11/2003 | Bobde et al. |
| 2003/0217142 | A1 | 11/2003 | Bobde et al. |
| 2004/0172481 | A1 | 9/2004 | Engstrom |
| 2005/0034078 | A1 | 2/2005 | Abbott et al. |
| 2005/0041580 | A1 * | 2/2005 | Petrovykh ................... 370/229 |
| 2005/0197155 | A1 | 9/2005 | Baker et al. |
| 2005/0216848 | A1 * | 9/2005 | Thompson et al. .......... 715/753 |
| 2006/0031062 | A1 | 2/2006 | Bakis et al. |
| 2006/0098619 | A1 | 5/2006 | Nix et al. |
| 2006/0190525 | A1 | 8/2006 | Bobde et al. |
| 2006/0190591 | A1 | 8/2006 | Bobde et al. |
| 2006/0212220 | A1 | 9/2006 | Bou-Ghannam et al. |
| 2006/0271277 | A1 | 11/2006 | Hu et al. |
| 2008/0034033 | A1 * | 2/2008 | Agrawal ..................... 709/203 |
| 2008/0040443 | A1 * | 2/2008 | Agrawal ..................... 709/207 |

FOREIGN PATENT DOCUMENTS

| | | |
|---|---|---|
| JP | 2001/500712 | 1/2001 |
| WO | 9800787 | 1/1998 |
| WO | WO 01/63862 | 8/2001 |
| WO | WO 03/061236 | 1/2002 |
| WO | WO 02/093408 | 11/2002 |

OTHER PUBLICATIONS

Handley, M. "SIP: Session Initiation Protocol," Request for Comments: 2543, Network Working Group, Category: Standards Track, Mar. 1999, © 1999 The Internet Society, pp. 1-136.

Handley, M. and V. Jacobson, "SDP: Session Description Protocol," Request for Comments: 2327, Network Working Group, Category: Standards Tracks, Apr. 1998, © 1998 The Internet Society, pp. 1-38.

Mahy, Rohan and Ilya Slain et al., "SIP Extensions for Message Waiting Indication," Internet Engineering Task Force, Internet Draft, Jul. 2000, pp. 1-20.

Moyer, S. et al., "Framework Draft for Networked Appliances using the Session Initiation Protocol," Internet Engineering Task Force, Internet Draft, Nov. 2000, pp. 1-25.

Roach, Adam, "Automatic Call Back Service in SIP," Internet Engineering Task Force, Internet Draft, Mar. 2000, pp. 1-7.

Roach, Adam, "Event Notification in SIP," Internet Engineering Task Force, Internet Draft, Nov. 2000, pp. 1-18.

Roach, Adam, "SIP-Specific Event Notification," Internet Engineering Task Force, Internet Draft, Category: Standards Track, Jul. 2001, pp. 1-32.

Rosenberg, Jonathan et al., "SIP Extensions for Presence Authorization," Internet Engineering Task Force, Internet Draft, Jun. 15, 2000, pp. 1-11.

Rosenburg, "A SIP Event Sub-Package for Watcher Information," Internet Engineering Task Force, Internet Draft, Jul. 13, 2001, pp. 1-12.

Rosenburg, Jonathan et al., "A Data Format for Presence Using XML," Internet Engineering Task Force, Internet Draft, Jun. 15, 2000, pp. 1-15.

Rosenburg, Jonathan et al., A Lightweight Presence Information Format (LPIDF), Internet Engineering Task Force, Interent Draft, Jun. 15, 2000, pp. 1-7.

Rosenburg, Jonathan et al., "An XML Based Format for Watcher Information," Internet Engineering Task Force, Internet Draft, Jun. 15, 2000, pp. 1-8.

Rosenburg, Jonathan et al., "An XML Format for Presence Buddy Lists," Internet Engineering Task Force, Internet Draft, Jun. 15, 2000, pp. 1-10.

Rosenburg, Jonathan et al., "SIP Extensions for Instant Messaging," Internet Engineering Task Force, Internet Draft, Jun. 15, 2000, pp. 1-28.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 91-102, vol. 10-No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Altering in Computing Systems, Microsoft Research, Aug. 1999.

Bill N. Schilit, et al., Disseminating Active Map Information to Mobile Hosts, IEEE Network, 1994, pp. 22-32, vol. 8-No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Habel. "Incremental Generation of Multimodal Route Instructions," http://www.cs.niu.edu/~nlgdial/final/SS703CHabel.pdf, last access Dec. 11, 2006, 8 pages, Hamburg, Germany.

Eugenio, et al. "Generating driving directions for intelligent vehicles interfaces," 12th IEEE International Conference and Workshops on the Engineering of Computer-Based Systems, 2005, 8 pages.

"Mapmylndia Rocks Indian Web2.0 with GoogleMap Type Digitised Mapping," http://www.webyantra.net/tag/mashup/, last accessed Mar. 16, 2007, 9 pages.

Koleszar. "A Landmark-Based Location Reference Grid for Street Maps," http://stinet.dtic.mil/oai/oai?&verb=getRecord&metadataPrefix=html&identifier=ADA070048, Defense Technical Information Center, Jun., 1, 1979, 1 pages.

"PDA Toshiba," http://www.citynotebookcentre.com.au/Products/PDA&CELL/Toshiba/toshiba_pda_e740.htm, last accessed Sep. 24, 2008, 5 pages.

Hampe et al. "Integrating topographic information and landmarks for mobile navigation," http://www.ikg.uni-hannover.de/publikationen/publikationen/2003/wien_hampe_elias.pdf, last accessed Mar. 14, 2007, 13 pages.

May et al. "Presence and Quality of Navigational Landmarks: Effect on Driver Performance and Implications for Design," http://magpie.lboro.ac.uk/dspace/bitstream/2134/2277/1/PUB284.pdf, last accessed Mar. 14, 2007, 40 pages, Loughborough, United Kingdom.

Case Study—Accessing Spatial Distribution of Web Resources for Navigation Services, Department of Geomatics, University of Melbourne, Australia, CRC for Spacial Information, 15 pages.

Rosenberg et al., SIP Extensions for Presence, Internet Engineering Task Force, Internet Draft, (37 pgs.) (Mar. 30, 2001); retrieved from the internet Dec. 8, 2003.

RFC "SIP Session Initiation Protocol" 1999, 1-143.

Varshney et al., "Voice Over IP," Communications of the ACM, Jan. 2002, pp. 89-96, vol. 45, Issue 1. ACM Press, New York, U.S.A.

Thai et al., "Intergrated Personal Mobility Architecture: A Complete Personal Mobility Solution," Mobile Networks and Applications, Feb. 2003, pp. 27-36, vol. 8, Issue 1, ACM Press, New York, U.S.A.

Maniatis et al., "The Mobile People Architecture," ACM SIGMOBILE, Mobile Computing and Communications Review. Jul. 1999, pp. 36-42, vol. 3, Issue 3, ACM Press, New York, U.S.A.

Schmandt et al., "Mediated Voice Communication Via Mobile IP," Proceedings of the 15th Annual ACM Symposium on User Interface Software and Technology, 2002, pp. 141-150, ACM Press, New York, U.S.A.

Perkins, "Mobile Networking in the Internet," Mobile Networks and Applications, 1998, pp. 319-334, vol. 3, Issue 4, ACM Press, New York, U.S.A.

* cited by examiner

METHOD AND SYSTEM FOR SUPPORTING THE COMMUNICATION OF PRESENCE INFORMATION REGARDING ONE OR MORE TELEPHONY DEVICES

CROSS-REFERENCE TO RELATED APPLICATION(S)

This application is a continuation of U.S. patent application Ser. No. 10/145,673 entitled "METHOD AND SYSTEM FOR SUPPORTING THE COMMUNICATION OF PRESENCE INFORMATION REGARDING ONE OR MORE TELEPHONY DEVICES, filed May 15, 2002, which application is incorporated herein by reference in its entirety.

TECHNICAL FIELD

The invention relates generally to communication between computers over a network, and more particularly, to methods and systems for conveying the presence information of one or more devices over the network.

BACKGROUND OF THE INVENTION

With today's widespread use of the Internet as a primary communication medium, standard communication tools are now capable of communicating over a computer network. For instance, telephones, pagers, cell phones, handheld computers, and even fax machines now offer features to allow them to be accessed and controlled from over the Internet via an IP address designation or other network addressing scheme. This ability, whereby various communication devices that traditionally use a circuit-switched telephone network, is known as network telephony, or IP telephony when an IP network is involved.

As a result of network telephony, today's devices have the ability to communicate with one another over networks such as the Internet to share information, or receive data. Furthermore, a user having several communication devices (e.g., a cell phone, laptop and handheld PC) can configure each of these devices to a network using a single alias or identifier, such as a username (e.g., username@b.com). In this way, the user is not limited to communicating with others via a single device, but instead has the ability to communicate via several different devices. Nonetheless, the ability for a user to have several devices "present" on a computer network creates a need for other users to be able to determine the status or state of the users many devices.

Presence refers to the availability, proximity, activity level or operating state of a user on a network. Commonly, the ability for users to monitor each other's presence and generate presence information is a feature offered in connection with computer-executable modules or applications that support network telephony. Such modules or applications are known commonly as presence user agents (PUAs). Examples of typical software applications that operate as PUAs or support PUA-like features include instant messaging applications such as MSN Messenger or AOL Instant Messenger. Both of these applications provide an "available buddy" feature, in which a user of the application can determine whether select users are available for engaging in a communication. The generated by the PUA to create the buddy list, i.e. "John OFFLINE" or "Susan ACTIVE," is known as presence information, and is generally retrieved and maintained by a presence agent.

According to most conventional network configurations, the presence agent is a dedicated server or computer-executable module that maintains presence information on behalf of a user having one or more computing devices. Typically, the presence agent supports network telephony protocols such as the session initiation protocol (SIP). Users can register their computing devices with the presence agent (e.g., via a registrar module) in order to have their presence maintained and network telephony services facilitated. As such, a user of a first computing device wishing to detect the presence of a user of a second computing device does so by "subscribing" with the presence agent, such as via a SIP SUBSCRIBE message. The presence agent intermediates between the first user, also known as the watcher, and the second user to facilitate the communication of the second user's presence information to the first user.

The ability of a presence agent to accurately determine and maintain presence information for one or more users significantly enhances communication and task completion over the network. Accurate generation of presence information by the PUA operating upon a user's device is also critical for effectively conveying presence. For example, a very mobile user may only be on the network at limited times throughout the day, and from varying network locations. By subscribing as a watcher of this mobile user, it becomes possible for another user to assume the role of a watcher and detect the presence of the mobile user during the limited times at which the mobile user's computing device is actually connected to the network. So, when the mobile user is present, the watcher can correspond instantly with the mobile user via a chat session or videoconferencing call, as opposed to resorting to non-real-time communication such as e-mail messaging. Hence, presence is an especially important factor for facilitating communication between users. Unfortunately, however, conventional PUAs are unable to provide presence information with respect to varying network or operating conditions, and particularly, information sufficient enough to indicate the ability of the device being watched to actually engage in a communication session as a result of a change.

As an example of this phenomenon, consider a scenario where a second user has subscribed with a presence agent as a watcher of a first user. If the first user is in the second users' available buddy list, and the first user's computing device suddenly goes into sleep mode, the second user's buddy list should still indicate that the first user's device is available for communication rather than indicate that the first user's device is "offline." An indication of offline does not accurately reflect that the first user's device may still be connected to the network and may be available to receive messages. Yet, many PUAs only provide generalized presence information such as "offline" or "unavailable," and do not account for more intricate presence conditions. Invariably, this phenomenon results in the present agent's inability to convey the presence of the user more accurately to the watcher.

Still further, many PUAs are unable to generate useful presence information for those users that have several devices registered and present upon the network. Current measures for conveying the presence of users having multiple devices simply call for the presence information of each individual device to be presented to the watcher as a compound document, such as an HTML file. As a result, the watcher that receives the compound document indicating the presence information for each device must inherently "guess" which device's presence information most accurately reflects the presence of the user. However, just because a user's mobile phone, pager, laptop, PDA, and desktop computer are all present on the network does not mean the user is using all of them. Indeed, the presence information of the individual devices says very little about the actual presence (e.g., activity or availability) of the user.

SUMMARY OF THE INVENTION

The invention presents a method for conveying the extent to which a user of a computing device is present upon the network given varying network and device operating conditions. The invention may be used on a variety of devices, including computing devices that communicate over a network via the SIP protocol, as well as those using other protocols. Also, the invention relates to a the use of a document for conveying the presence of a user of a plurality of computing devices.

In accordance with an embodiment of the invention, a computing device operable by a user over a computer network (e.g., PDA, cell phone, laptop, and pager) generates presence information indicative of the user's degree of presence upon the network. More specifically, the device operates a PUA, or the like, that generates a presence document that specifies an activity level and availability level pertaining to the user. The activity level is an attribute of the presence document that indicates what action the user or corresponding device may be engaged in (e.g., idle, away), thus providing an indication of the likelihood of calls or messages actually being accepted from over the network. In relation to the activity level is the availability level, which is an attribute of the presence document that indicates whether the user's computing device may actually receive calls based on various network or device operating conditions (e.g., offline, online). The activity level and availability level are assigned as a range of values (e.g., numerical, alphabetical), with the higher value representing a higher degree of activity or availability, and the lower value representing a lower degree of activity or availability.

In accordance with a further embodiment of the invention, the presence document may also specify a description attribute, which is an attribute associated with the activity or availability level that provides a functional or plain-language description of the assigned level. Also, in addition to the activity and availability level, other attributes may be included within the presence document for conveying user presence, including custom properties that are defined by the user or user's device. By including the user's level of availability and activity within the presence document, a watcher or presence agent that receives the document is able to determine more accurately the extent to which the user is present upon the network.

In accordance with yet another embodiment of the invention, a network device acting on behalf of a user of a plurality of computing devices generates a single presence document that conveys the overall presence of the user. The network device can be a server operating as a presence agent, or any other device capable of processing presence information. The user's computing devices generate presence documents to indicate their respective level of activity and availability upon the network, as described above. The network device then processes the presence documents, and generates a single presence document that includes the presence information for each of the plurality of devices, but only the activity level and availability level of the computing device that indicates the highest degree of presence. As such, a watcher is able to determine the user's presence with respect to all of the user's devices.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
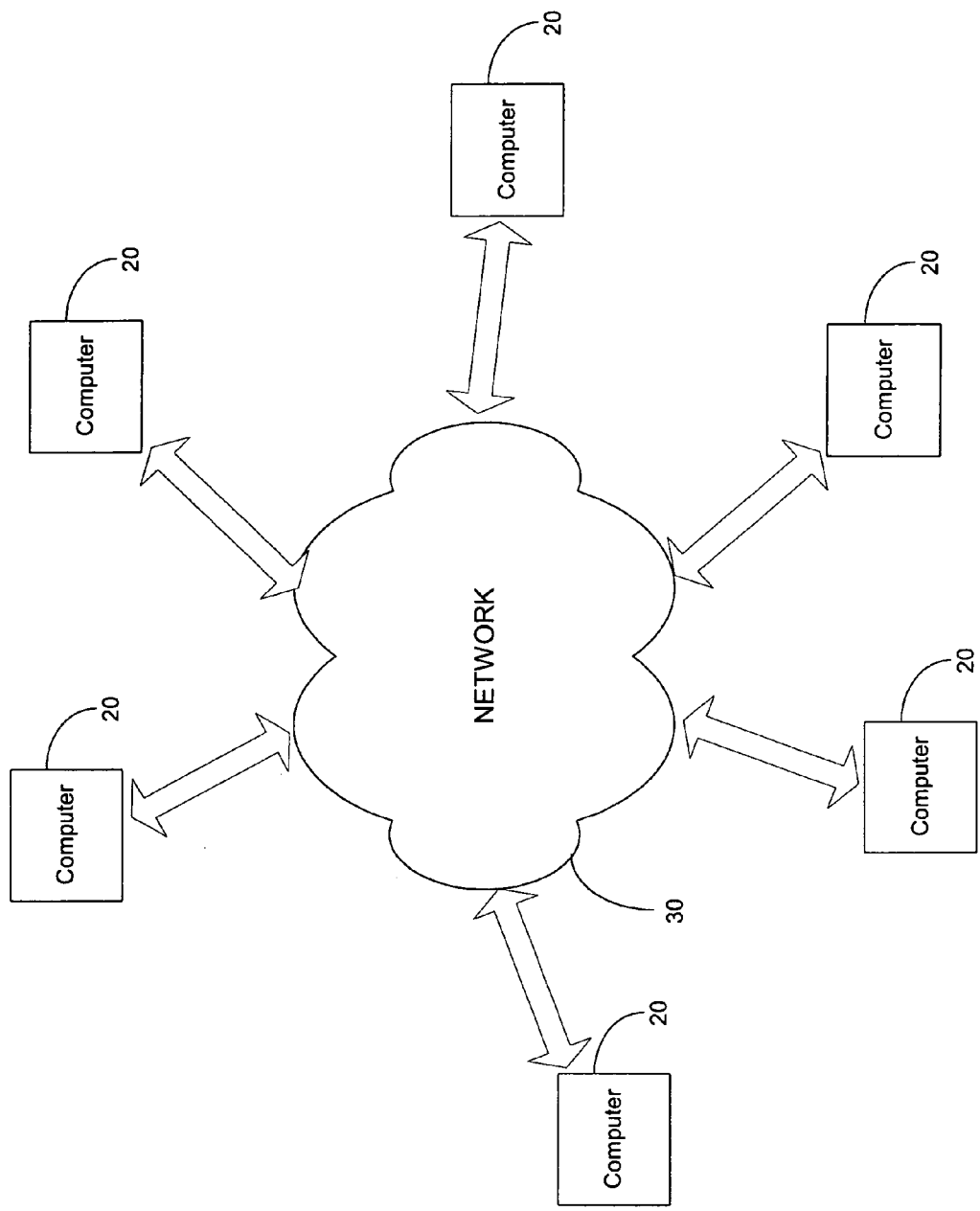
FIG. 1 is an example of a computer network.

The invention presents a method for conveying the extent to which a user of a computing device is present upon the network given varying network and device operating conditions. Also, the invention relates to a method for indicating the presence of a user of a plurality of computing devices using a single presence document. In the context of the invention, presence information describes any data that specifies the availability, proximity, activity level or operating state of a computing device or corresponding user of the device from over the network. For example, presence information can be analyzed by a user of a first computing device (a watcher) to determine if a user of a second computing device (a registered device user) is online or offline, busy or idle. This determination is dependent on various factors, including the current activity of the second user, the present operating state of the second user's computing device, etc. In an effort to stay consistent with common terminology used in the computing industry, this detailed description will use the term "presence" synonymously with the term "presence information" at various times. Moreover, the terms "presence" or "presence information" should be interpreted as relating to the user or one or more devices employed by the user. Those skilled in the art will easily recognize that these terms presence and presents relate to the same phenomenon with respect to network telephony.

Also, the invention will be described throughout the course of the description with respect to SIP as a messaging protocol for supporting communication between devices in accordance with the teachings of the invention. Once again, those of skill in the art will recognize that SIP is only one protocol suitable for supporting network telephony and presence, and that other protocols may just as easily be utilized. Other such protocols include the H.323 standard and the Single Computer Telephony Protocol (SCTP). The invention is not limited to any one protocol or messaging implementation, as any means or medium by which two or more devices may communicate to support network telephony applications is suitable. Furthermore, the invention is not limited to any particular network telephony configuration, as any means for exchanging messages between one or more computers via SIP or the like is suitable for use in connection with the invention. This includes network configurations where computing devices such as proxies, redirect servers, registration terminals, presence servers and agents, and one or more clients (presentities) are involved in the communication.

As used herein, the term "network telephony" relates to any process wherein a network, such as the Internet, is used as a transmission medium for placing telephone calls or facilitating multimedia sessions between two or more computing devices. This can include multimedia sessions where streaming media (e.g., audio and video data) is exchanged over the network, conference calls, virtual meetings, and other telephony sessions. The term "network telephony" is generic, and can therefore describe or pertain to several other communication processes involving the exchange of packetized data. These include, but are not limited to, IP telephony, Voice over the Internet (VOI) and Voice over IP (VOIP). Also, as used herein, the term "call" (e.g., telephone call) relates to a session in which an exchange of information is commenced or initiated between two or more computing devices over a network, such as with the aide of a telephony application (e.g., MICROSOFT NetMeeting™). In the context of the present invention, a "call" is synonymous to a "message" being sent between devices, and will be used interchangeably at times to describe the interaction between two or more devices over the network.

An example of a networked environment in which the invention may be used will now be described with reference to FIG. 1. The example network includes several computers 20 communicating with one another over a network 30, such as the Internet, as represented by a cloud. Network 30 may include many well-known components, such as routers, gateways, hubs, etc. and may allow the computers 20 to communicate via wired and/or wireless media.

Figure 2:
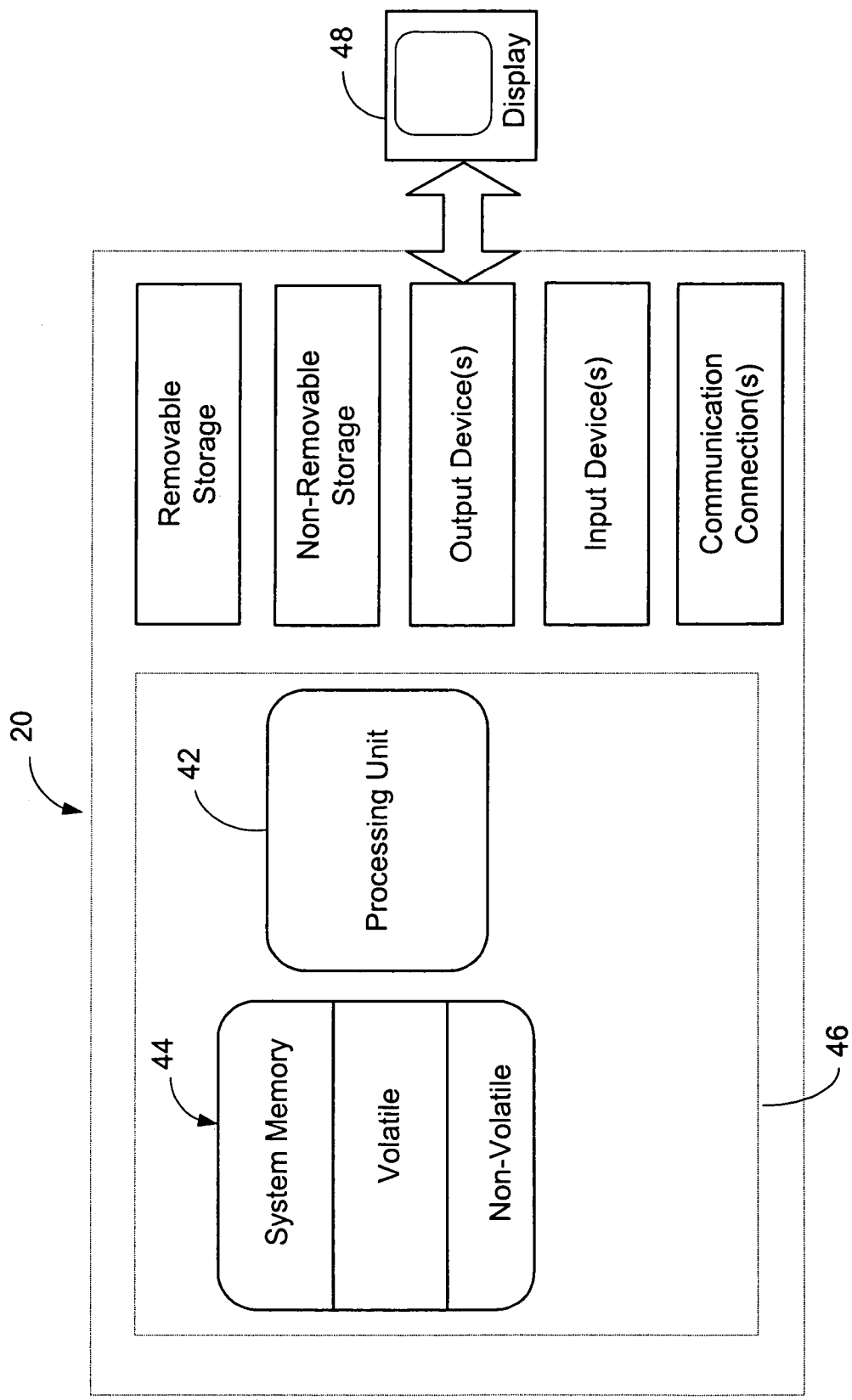
FIG. 2 is an example of a computer.

Referring to FIG. 2, an example of a basic configuration for a computer on which the system described herein may be implemented is shown. In its most basic configuration, the computer 20 typically includes at least one processing unit 42 and memory 44. Depending on the exact configuration and type of the computer 20, the memory 44 may be volatile (such as RAM), non-volatile (such as ROM or flash memory) or some combination of the two. This most basic configuration is illustrated in FIG. 2 by dashed line 46. Additionally, the computer may also have other features/functionality. For example, computer 20 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 20. Any such computer storage media may be part of computer 20.

Computer 20 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 20 may also have input devices such as a keyboard, mouse, pen, voice input device, touch input device, etc. Output devices such as a display 48, speakers, a printer, etc. may also be included. All these devices are well known in the art and need not be discussed at length here.

Figure 3:
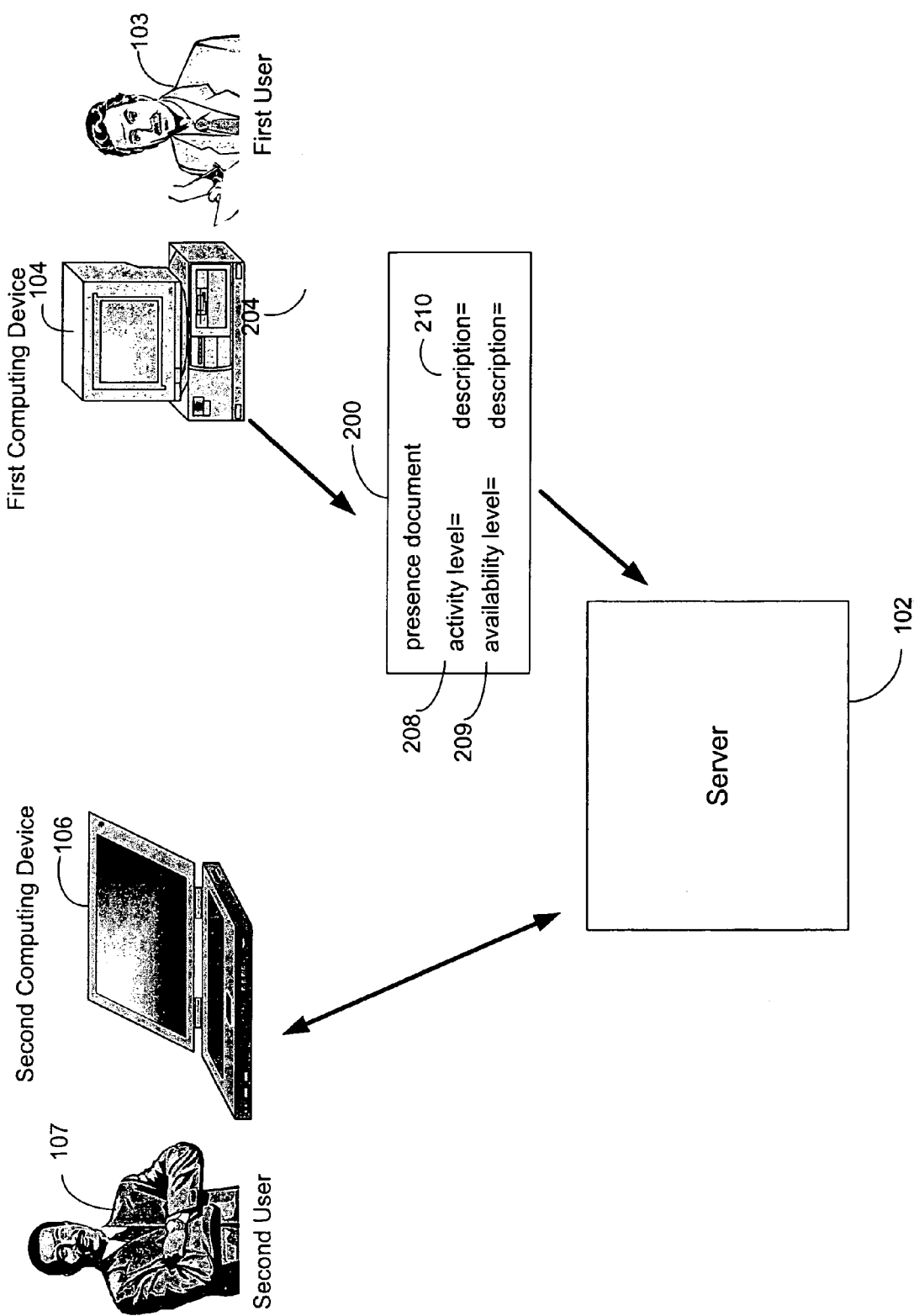
FIG. 3 is a diagram illustrating a server facilitating a call between a first computing device and a second computing device over the network in accordance with various embodiments of the invention.

Referring now to FIG. 3, a general environment for facilitating the communication of presence between one or more computers is illustrated. A server 102 operates as a presence agent, and facilitates the maintenance and transfer of presence information pertaining to the first user 103 with other devices over the network, referred to as watchers. In this example, the server 102 facilitates the transfer of presence information pertaining to a first user 103 with a second user 107. The server 102 is a computing device that processes messages conforming to a protocol for supporting network telephony (e.g., SIP, H.323). A second device 106, which in this case is a watcher, executes a presence user agent (PUA) that allows it to receive and interpret the presence information of the user 103 of the first device 104. The first user 103 operates a first device 104 that executes a PUA for generating presence information. When the second user 107 is allowed to receive the presence information pertaining to the first user 103, the server 102 transfers the presence document to the second device 106.

The various methods of orchestrating a communication session between the first and second devices, and for transferring presence information by the server 102, are not discussed in herein. Also, the various access and control procedures commonly employed by a presence agent 102 for ensuring proper access to presence information will not be discussed. Indeed, it is well known in the art that various schemes exist for controlling and adapting the interaction between the first 103 and second user 107 to ensure proper access to and communication of presence information (e.g., usage of an access control list).

In accordance with an embodiment of the invention, the first device 104 generates a presence document 200 to convey the extent of its presence upon a network. The presence document 200 is comprised of one or more attributes that relate to the presence of the first computing device 104 or corresponding user 103 of the first computing device 104. Such attributes include an availability level 208 and activity level 209. Also, in association with the availability level 208 and activity level 209 is the description attribute 210. The description attribute provides a functional, or plain-language description of the assigned activity or availability level, and is specified at the discretion of the first computing device 200. For each presence document generated by a computing device related to the first user 103, one activity level and availability level is specified. By specifying these attributes within the presence document 200, the server 102, acting as a presence agent on behalf of the first user 103 receives presence information that indicates the presence of the first user 103 and corresponding first device 104. Similarly, the second user 107, acting as a watcher of the first user 103, is better able to understand the extent of presence of the first user 103.

The availability level 208 (FIG. 3) is an attribute that indicates whether the first computing device 104 or first user 103 may actually receive calls. The first computing device 104 specifies various availability levels, including those shown in TABLE 1 below. Yet, only one availability level need be specified for a single device at a time.

TABLE 1

Availability level settings

| Availability Level | Associated Description of Availability Level | Explanation |
|---|---|---|
| 000 | Offline | The user cannot receive calls. |
| 100 | Undetermined | The user may be online, but there is no way to know until a call is attempted. |
| 200 | Connected | The user has a device currently connected that can receive calls. |
| 300 | Online | The user is in proximity to a device that can receive calls. |

The availability levels are spread into classes, where each class is a multiple of 100. This is analogous to the response code numbering system used in communication protocols such as the hypertext transfer protocol (HTTP) and SIP. Those skilled in the art will recognize, however, that different values or classes may be used to specify the availability level of the first computing device 104, and that the invention is not limited to any specific implementation. For example, the first computing device 104 may want to indicate a greater level of availability than "online," but may not want to show an availability of "always," and create a new availability value 250: "likely to take call." If the second computing device 211 is not familiar with this particular attribute, and receives such presence information, it can abstract it to a class in which is it familiar (e.g., it can generalized to 200: "connected").

The activity level 209, provides an indication of the action in which the first computing device 104 or corresponding first user 103 is engaged. The activity level 209 indicates to the second computing device 106 or other devices that are in the role of watchers the likelihood of calls or messages being accepted by the first computing device 104 or first user 103. Various activity levels may be specified within the presence document 200, as shown in Table 2 below.

TABLE 2

Activity level settings

| Activity Level | Associated Description of Activity Level | Explanation |
|---|---|---|
| 000 | No explicit activity | There is no information about the activity of the user. |
| 100 | Away | The user is away from the device |
| 150 | At lunch | The user is away at lunch |
| 200 | Idle | No specific activity is currently being engaged |

TABLE 2-continued

Activity level settings

| Activity Level | Associated Description of Activity Level | Explanation |
|---|---|---|
| 300 | Temporarily unavailable | The user is not available at the present time |
| 400 | Active | The user is active |
| 500 | In call | The user is already participating in a communications session. |
| 600 | Busy | The user is busy |
| 700 | Do not disturb | The user does not want to participate in a communication session |
| 800 | Always interruptible | User will stop whatever they're doing to receive a call. |

Again, those skilled in the art will recognize that the invention is not limited to the set of values or activity classes shown in TABLE 2. Also, it will be recognized by those skilled in the art that specifying the activity level 209 of the 208 first computing device 104 or user 103 in connection with the availability level ensures for more accurate presence. This is in contrast with many existing systems for conveying presence information, in which less useful presence attributes are provided. For example, if a presence document only indicates that the user is "busy," this is not sufficient information for the watcher to determine if calls can actually be placed with the first computing device 104. Just because the first user 103 is busy does not mean that calls are not to be received from the second computing device 106. Various embodiments of the invention account for such intricate distinctions in presence by indicating both the activity level 208 (e.g., busy or active) and availability level 209 (e.g., connected) of a computing device and/or its corresponding user.

To further describe the various inventive concepts disclosed herein, examples of the kind information contained in a presence document will now be presented. Possible formats of the various attributes and data included within a presence document to more accurately confer the extent of a user's presence will also be discussed. Appropriate references will be made to Table 3, which shows an example of a presence document structured according to an embodiment of the invention. For the sake of discussion, those skilled in the art will recognize that the example presence document illustrated in Table 3 is not to be taken as representative of the format for every user situation. Indeed, the formatting and attributes included within the presence document of Table 3 may vary from user to user. Also, it will be recognized by those skilled in the art that numerous standards exist for formatting a presence document, such as XML or SGML, and that the invention is not limited to any one implementation.

TABLE 3

```
<presently uri = "SIP:nate@snake.net">
    <availability aggregate = "200" description="online"/>
    <activity aggregate = "800" description = "do not disturb" override="true"/>
    <contact contact="2314@192.1.1.5:5060; q=0.3" />
    <modes modes="TEXT" AUDIO VIDEO WHITEBOARD APPSHARE
FILETRANSFER" />
    <displayName displayName="Nate the evil genius."/ >
    <note note="I am busy plotting. Don't bother me unless there's a good reason" />
    <phoneNumber label="Phone in secret lair" number= "+1-787-312-8321" />
    <preferred Device
        deviceType="E164"
        label="Phone in secret lair"
        number="+1-787-312-8321"
```

TABLE 3-continued

```
        affinity="0" />
    <!-- some custom properties -->
    <archEnemy
        aggregate-"append"
        name="Doctor Nobody"
        comment = "This guy is pretty tricky! Be careful if you meet him!" />
    <archEnemy
        aggregate-"append"
        name="K9 the robot dog"
        comment = "IMHO best to wait for his batteries to run flat.">
        <!-- custom props can pretty much do what
        they like as long as they don't break the
        <instructions>
            Here are the schematics <schematics encoding="CAD">
    ASOIDCIOPUASKDCOILUOIUOIPUASDKLCUASDLKFJALSKCKM
    ASOIDCIOPUASKDCOILUOIUOIPUASDKLCUASDLKFJALSKCKM
            SCHEMATICS> for this pesky robot.
        </instructions>
    </archEnemy>
</presentity>
```

The various elements, attributes, and properties that comprise the presence document of Table 3 are as follows:

Presentity:<presentity uri="SIP:nate@snake.net">

The containing element for the presence document of Table 3 is <presentity>, which identifies the user with a uniform resource indicator (URI). All sub-elements in <presentity> are regarded to be individual properties.

Availability:<availability aggregate="200" description="online"/>

The <availability> property indicates whether the user can receive a call. Possible values include "offline," "undetermined" (e.g. cell phone carriers obscure availability default), and "online."

Rather than using a hard-coded enumeration, a numeric value is used in this example. This makes it easy to compare the activity sent by two different PUAs. For example: given 200 "online," and 100 "undetermined," a watcher can conclude that the overall state is 200, since the number is higher. The "description" attribute provides a label for the availability state. In the example of Table 3, the pre-defined values are split into classes defined by multiples of 100. Hence, an implementer can add an additional state and software that doesn't recognize that particular state still knows how to aggregate states, and still knows a state that is approximately the same as the proprietary state. For example, a value of 250 could mean "likely to take call." This is in the 2xx class; hence a variant of "online," but it is more informative. Hence if one PUA sets 200, and another sets 250, the aggregate is 250—"likely to take a call."

Activity:

<activity aggregate="800" description="do not disturb" override="true"/>

The <activity> property indicates the activity of a computing device. It uses a numerical value in a manner similar to the availability property.

An attribute called "override" is shown as being used in conjunction with the <activity> property, but it may also be used in conjunction with other properties. The override attribute is used to indicate that a particular property is exempt from the aggregation rules. A possible scenario is that a user may actively set a property at a particular PUA, and may want this property to be used in their aggregate presence regardless of what other values were sent by other PUAS.

Contact: <contact contact="2314@192.1.1.5:5060; q=0.3"/>

The <contact> property indicates how the user can be contacted. There can be any number of <contact> entries in a presence document.

Communications Modes:

<modes modes="TEXT AUDIO VIDEO WHITEBOARD APPSHARE FILETRANSFER"/>

The modes supported by the devices the PUA represents are listed in a <modes> property. If a mode isn't listed, it isn't supported. For example, assume there is a new collaborative technology called Super Foo. When a user runs Super Foo, the user's computing device advertises its capabilities as <modes modes="SUPERFOO AUDIO VIDEO"/>. If a watcher of the user just wants to talk to the user using audio, it may. But if the watcher's computing device also has Super Foo capability, it can use the new collaboration technology.

If the presence document represents devices that support different sets of modes (e.g. an instant messaging client and a phone), it can include multiple <modes> elements. If a watcher wants to know whether the user supports a specific combination of modes, the watcher looks for a <modes> element that contains the specific combination. If a watcher doesn't care that these modes are on different devices, the watcher just looks to see if the modes are listed in any of the <modes> elements.

Display Name: <displayName displayName="Nate the evil genius."/>

The <displayName> property is the watched user's screen name.

Note:

<note note="I am busy plotting. Don't bother me unless there's a good reason"/>

The <note> property includes whatever additional notes the watched user wishes to add.

Phone Number:

<phoneNumber label="Phone in secret lair" number="+1-787-312-8321"/>

The <phone number> property represents the watched user's phone number or numbers. Possible labels include "Cell" or "Office."

Preferred Device:

```
<preferredDevice
    deviceType="E164"
    label="Phone in secret lair"
    number="+1-787-312-8321"
    affinity="0" />
```

The <preferredDevice> property indicates the device on which the watched user prefers to communicate. If the deviceType is "DNS," the requests are to be routed through the SIP proxy network using DNS URI addressing. If the deviceType is "E164," for example, a phone number is also included. Affinity may also be used to establish relative preference when multiple preferred devices are listed. A label is included so the user can describe his/her preferences, if desired.

Custom Properties:

```
<archEnemy
    aggregate="append"
    name="Doctor Nobody"
    comment="This guy is pretty tricky! Be careful if you meet him!" />
```

Custom properties are properties that applications can define for themselves.

Up to this point, the invention has been described with respect to the interaction between one or more users that act as watchers, a computing device, and a corresponding user being watched. However, in many instances the user being watched may have more than one device (registered) with the network device at a time. In such cases, presence information is generated by each of the devices, resulting in several presence documents being generated and exchanged with the server that handles presence administration.

According to various embodiments of the invention, presences documents generated by multiple devices of a user are aggregated into a single document. There are a variety of ways in which this can be done, but one implementation involves the following:

(a) The document having the highest activity level is identified;

(b) overrides are applied;

(c) the activity and availability properties for the document having the highest activity level are copied into the new aggregate presence document, except as otherwise dictated by overrides;

(d) all other properties (other than activity and availability) are copied into the new aggregate presence document.

(e) The "contacts" properties are removed.

The following example illustrates this implementation. In this example, it is assumed that a fictional character, Nate, is an evil mastermind with his own SIP address (SIP: nate@snake.net). Nate has the following devices:

An IP desk phone;

A PC running the RTC client UI; and

A fancy wristwatch that does audio as well as text.

Nate communicates with a number of other evil geniuses. As well as using his presence service for basic presence information, this circle of collaborators like to know who each other's enemies are. So Nate maintains another property in his presentity that indicates who his arch enemy is. This enables the villains to gang up and/or backstab each other with greater efficiency.

Nate's desk phone doesn't have a PUA. However it is registered to the network. The presence agent server (PAS) notes that the phone is registered, but doesn't have a presence document posted. It assumes the default document shown in Table 4:

TABLE 4

```
<presentity uri="SIP:nate@snake.net">
    <availability aggregate="300" description="online" />
    <activity aggregate="000" description="no explicit
    activity" />
    <contact contact="1324123@192.1.1.3:5060; user=phone;
    q=0.3" />
    <modes modes="AUDIO" />
</presentity>
```

Nate is logged on at his desk PC where he set "do not disturb," but he hasn't used it for hours because he isn't there. He also uses his PC to maintain his ever expanding list of arch enemies. His PC generates the presence document shown in Table 5.

TABLE 5

```
<presentity uri="SIP:nate@snake.net">
    <availability aggregate="200" description="connected" />
    <activity aggregate="800" description="do not disturb"
    override="true"/>
    <contact contact="e2314@192.1.1.5:5060; q=0.3" />
    <modes modes="TEXT AUDIO VIDEO WHITEBOARD
    APPSHARE FILETRANSFER" />
    <displayName displayName="Nate the evil genius. Bwa ha
    ha ha!" />
    <note note="I am busy plotting. Don't bother me." />
    <phoneNumber label="Phone in secret lair" number= "+1-
    787-312-8321" />
    <preferredDeviceType
        deviceType="E164"
        label="Phone in secret lair"
        number="+1-787-312-8321"
        affinity="0" />
    <!-- some custom properties -->
    <archEnemy
        aggregate="append"
        name="Doctor Nobody"
        comment="This guy is pretty tricky! Be careful if
        you meet him!" />
    <archEnemy
        aggregate="append"
        name="K9 the robot dog">
        <instructions>
            Here are the schematics <schematics
            encoding="UTF-8">
            ASOIDCIOPUASKDACOILUOIUOIPUAS
            </schematics> for this pesky robot.
        </instructions>
    </archEnemy>
</presentity>
```

He's used his wristwatch to override the "do not disturb" with "active," and the wristwatch generates the presence document shown in Table 6.

TABLE 6

```
<presentity uri="SIP:nate@snake.net">
    <availability aggregate="200" description="connected" />
    <activity
        aggregate= "400"
        description="active"
```

TABLE 6-continued

```
        scope="user:Mon, 01 Jan 2002 16:10:44 GMT"/>
    <contact contact="1234123@192.1.1.231:443; q=0.9" />
    <!-- This device supports a mode not native to the V.1 or
    V.1.1 client -->
    <modes modes="TEXT AUDIO TELEPATHY" />
    <displayName displayName="Nate" />
    <note note="Now is a good time to call me" />
    <phoneNumber label="Phone in secret lair" number= "+1-
    787-312-8321" />
    <phoneNumber label="Fancy watch phone" number= "+1-
    787-312-3121" />
    <preferredDeviceType
        deviceType="IP"
        affinity="900" />
</presentity>
```

The document with the highest activity level is the document shown in Table 5, which represents the document generated by Nate's PC. Therefore, an availability level of 200 and an activity level of 800 would ordinarily be copied into the aggregate document. However, Nate has chosen to override the "Do not disturb" level (800) with the "connected" level (200). Thus, watchers see the following aggregate document.

TABLE 7

```
<presentity uri="SIP:nate@snake.net">
    <availability aggregate="200" description="connected" />
    <activity aggregate= "400" description="active"/>
    <modes modes="AUDIO" />
    <modes modes="TEXT AUDIO VIDEO WHITEBOARD
    APPSHARE FILETRANSFER" />
    <modes modes="TEXT AUDIO TELEPATHY" />
    <displayName displayName="Nate Jones" />
    <note note="I am busy plotting. Don't bother me." />
    <note note="Now is a good time to call me" />
    <!-- phone numbers have been concatenated -->
    <phoneNumber label="Phone in secret lair" number= "+1-
    787-312-8321" />
    <phoneNumber label="Fancy watch phone" number= "+1-
    787-312-3121" />
    <preferredDeviceType
        deviceType="IP"
        affinity="900" />
    <preferredDeviceType
        deviceType="E164"
        label="Phone in secret lair"
        number="+1-787-312-8321"
        affinity="0" />
    <archEnemy
        aggregate="append"
        name="Doctor Nobody"
        comment="This guy is pretty tricky! Be careful if
        you meet him!" />
    <archEnemy
        aggregate="append"
        name="K9 the robot dog"
        <instructions>
            Here are the schematics <schematics
            encoding="UTF-8">
            ASOIDCIOPUASKDACOILUOIUOIPUAS
            </schematics> for this pesky robot.
        </instructions>
    </archEnemy>
</presentity>
```

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

Software applications suitable for generating presence documents include, but are not limited to, e-mail utilities, instant messaging programs, network monitoring programs, video/audio conferencing programs and other such applications. The invention is not limited to any particular PUA implementation, as any mechanism usable by a computing device for generating presence information pertaining to a user is within the scope of the invention.

We claim:

1. A method for aggregating presence information associated with a plurality of computing devices that are associated with a user, the method comprising:

receiving from a first computing device a first presence document comprising a first availability level indicating whether the first computing device may receive a communication and a first activity level indicating action in which the user is engaged;

receiving from a second computing device a second presence document comprising a second availability level indicating whether the second computing device may receive a communication and a second activity level indicating action in which the user is engaged;

comparing the first activity level with the second activity level, wherein the second activity level is higher than the first activity level;

based upon the comparison, selecting the first activity level from the first presence document as an aggregate activity level;

creating an aggregate presence document, wherein the aggregate presence document includes the aggregate activity level and an aggregate availability level that is the first availability level of the first presence document; and providing the aggregate presence document to a watcher device, wherein the aggregate availability level and the aggregate activity level are sufficient to permit the watcher computing device to determine how to submit a communication to the user.

2. The method of claim 1 wherein the first availability level is selected from the group consisting of offline, undetermined, connected, and online.

3. The method of claim 1 wherein the first activity level is selected from the group consisting of no explicit activity, away, at lunch, idle, temporarily unavailable, active, in a call, busy, do not disturb, and always interruptible.

4. The method of claim 1 wherein the first availability level is selected from the group consisting of offline, undetermined, connected, and online and wherein the first activity level is selected from the group consisting of no explicit activity, away, at lunch, idle, temporarily unavailable, active, in a call, busy, do not disturb, and always interruptible.

5. The method of claim 1 wherein the aggregate activity level indicates a likelihood of a communication being accepted by the first computing device or the second computing device.

6. The method of claim 1 wherein the first activity level indicates to override the second activity level.

7. A system for aggregating presence information associated with a plurality of computing devices that are associated with a user, comprising:

a presence server device comprising:
at least one communication connection that:
receives from a first computing device a first presence document comprising a first availability level and a first activity level, the first availability level indicating whether the first computing device may receive a communication and the first activity level indicating action in which the user is engaged;

receives from a second computing device a second presence document comprising a second availability level and a second activity level, the second availability level indicating whether the second computing device may receive a communication and the second activity level indicating action in which the user is engaged; and provides access to an aggregate presence document;

at least one processing unit; and a memory, communicatively coupled to the at least one processing unit, that stores:

the first activity level and the first availability level received from the first computing device and the second activity level and the second availability level received from the second computing device; and computer executable instructions that, when executed by the at least one processing unit:

compares the first activity level with the second activity level, wherein the second activity level is higher than the first activity level;

based upon the comparison, selects the first activity level from the first presence document as an aggregate activity level;

creates an aggregate presence document, wherein the aggregate presence document includes the aggregate activity level and an aggregate availability level that is the first availability level of the first presence document; and transmits the aggregate presence document via the communication connection to a watcher computing device, wherein the aggregate availability level and the aggregate activity level are sufficient to permit the watcher computing device to determine how to submit a communication to the user.

8. The system of claim 7 wherein the aggregate activity level indicates a likelihood of a communication being accepted by the first computing device or the second computing device.

9. The system of claim 7 wherein the first activity level indicates to override the second activity level.

10. A computer storage medium comprising stored computer-executable instructions that, when executed by a computing device configured as a presence server, cause the presence server to:

receive from a first computing device a first presence document comprising a first availability level indicating whether the first computing device may receive a communication and a first activity level indicating action in which the first computing device or the user is engaged;

receive from a second computing device a second presence document comprising a second availability level indicating whether the second computing device may receive a communication and a second activity level indicating action in which the second computing device or the user is engaged;

comparing the first activity level with the second activity level, wherein the second activity level is higher than the first activity level;

based upon the comparison, select the first activity level from the first presence document as an aggregate activity level;

create an aggregate presence document, wherein the aggregate presence document includes the aggregate activity level and an aggregate availability level that is the first availability level of the first presence document; and provide the aggregate presence document to a watcher device, wherein the aggregate availability level and the aggregate activity level are sufficient to permit the watcher computing device to determine how to submit a communication to the user.

11. The computer storage medium of claim 10 wherein the first availability level is selected from the group consisting of offline, undetermined, connected, and online.

12. The computer storage medium of claim 10 wherein the first activity level is selected from the group consisting of no explicit activity, away, at lunch, idle, temporarily unavailable, active, in a call, busy, do not disturb, and always interruptible.

13. The computer storage medium of claim 10 wherein the first availability level is selected from the group consisting of offline, undetermined, connected, and online and wherein the first activity level is selected from the group consisting of no explicit activity, away, at lunch, idle, temporarily unavailable, active, in a call, busy, do not disturb, and always interruptible.

14. The computer storage medium of claim 10 wherein the aggregate activity level indicates a likelihood of a communication being accepted by the first computing device or the second computing device.

15. The computer storage medium of claim 10 wherein the first activity level indicates to override the second activity level.

16. A method for aggregating presence information associated with a plurality of computing devices that are associated with a user, the method comprising:

receiving from a first computing device a first presence document comprising a first availability level indicating whether the first computing device may receive a communication and a first activity level indicating action in which the user is engaged;

receiving from a second computing device a second presence document comprising a second availability level indicating whether the second computing device may receive a communication and a second activity level indicating action in which the user is engaged;

comparing the first availability level with the second availability level, wherein the first availability level and the second availability level are within a range of availability-level values and the first availability level is a value that is higher than the second availability level;

based upon the comparison, selecting the first availability level from the first presence document as an aggregate availability level;

creating an aggregate presence document, wherein the aggregate presence document includes the aggregate availability level and an aggregate activity level that is the first activity level of the first presence document; and providing the aggregate presence document to a watcher device, wherein the aggregate availability level and the aggregate activity level are sufficient to permit the watcher computing device to determine how to submit a communication to the user.

* * * * *

UNITED STATES PATENT AND TRADEMARK OFFICE
CERTIFICATE OF CORRECTION

PATENT NO. : 7,653,715 B2 Page 1 of 1
APPLICATION NO. : 11/343644
DATED : January 26, 2010
INVENTOR(S) : Bobde et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 270 days.

Signed and Sealed this

Twenty-third Day of November, 2010

David J. Kappos
*Director of the United States Patent and Trademark Office*